US011149637B2

(12) United States Patent
Todorovic

(10) Patent No.: US 11,149,637 B2
(45) Date of Patent: Oct. 19, 2021

(54) NACELLE FOR A TURBOFAN ENGINE

(71) Applicant: Rolls-Royce Deutschland Ltd & Co KG, Blankenfelde-Mahlow (DE)

(72) Inventor: Predrag Todorovic, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 470 days.

(21) Appl. No.: 15/923,212

(22) Filed: Mar. 16, 2018

(65) Prior Publication Data
US 2018/0283276 A1    Oct. 4, 2018

(30) Foreign Application Priority Data

Mar. 31, 2017  (DE) ...................... 10 2017 106 954.2

(51) Int. Cl.
*B64D 29/06*  (2006.01)
*B64D 33/02*  (2006.01)
(Continued)

(52) U.S. Cl.
CPC .............. *F02C 7/042* (2013.01); *B64D 29/06* (2013.01); *B64D 33/02* (2013.01); *F02C 7/28* (2013.01);
(Continued)

(58) Field of Classification Search
CPC ......... B64C 29/00; B64C 29/06; B64C 33/02; B64C 2033/0266; B64C 2033/0273;
(Continued)

(56) References Cited

U.S. PATENT DOCUMENTS 3,623,494 A    11/1971   Poucher et al.
5,014,933 A    5/1991    Harm et al.
(Continued)

FOREIGN PATENT DOCUMENTS

DE    1078375 B    3/1960
EP    2003310 A2   12/2008
(Continued)

OTHER PUBLICATIONS

German Search Report dated Jan. 12, 2018 from counterpart German App No. 10 2017 106 954.2.
(Continued)

*Primary Examiner* — Timothy D Collins
*Assistant Examiner* — Terri L Filosi
(74) *Attorney, Agent, or Firm* — Shuttleworth & Ingersoll PLC; Timothy Klima

(57) ABSTRACT

An engine nacelle for a turbofan engine, having a nacelle wall and an engine inlet, wherein the nacelle wall has a stationary downstream section and an upstream section that is displaceable in the axial direction, and the displaceable upstream section is displaceable between a first upstream position and a second downstream position. A ring-shaped seal is provided, formed between the stationary section and the displaceable section of the nacelle wall, wherein, in the first position of the displaceable section, the engine nacelle forms a ring-shaped additional flow channel that extends from the outer side of the nacelle wall to the engine inlet and via which ambient air can flow into the engine inlet, and the ring-shaped additional flow channel is closed in the second position of the displaceable section, wherein the stationary section, the ring-shaped seal and the displaceable section adjoin each other.

20 Claims, 11 Drawing Sheets

(51) Int. Cl.
*F02C 7/042* (2006.01)
*F02C 7/28* (2006.01)

(52) U.S. Cl.
CPC .............. *B64D 2033/0286* (2013.01); *F05D 2220/323* (2013.01); *F05D 2250/90* (2013.01)

(58) Field of Classification Search
CPC ............ B64C 2033/0286; B64D 29/00; B64D 29/06; B64D 33/02; B64D 2033/0266; B64D 2033/0273; B64D 2033/0286
See application file for complete search history.

(56) References Cited

U.S. PATENT DOCUMENTS

| | | | |
|---|---|---|---|
| 5,177,957 A | 1/1993 | Grieb | |
| 6,182,787 B1 * | 2/2001 | Kraft | F02C 7/045 |
| | | | 181/292 |
| 9,719,421 B2 | 8/2017 | Todorovic | |
| 2009/0301095 A1 | 12/2009 | Zysman et al. | |
| 2014/0048656 A1 * | 2/2014 | Schlipf | B64C 9/22 |
| | | | 244/214 |

FOREIGN PATENT DOCUMENTS

| | | |
|---|---|---|
| GB | 717760 A | 11/1954 |
| GB | 940584 A | 10/1963 |

OTHER PUBLICATIONS

European Office Action dated Nov. 21, 2019 from counterpart European Patent Application No. 18162539.3.
European Search Report dated Sep. 17, 2018 from counterpart European App No. 18162539.3.

* cited by examiner

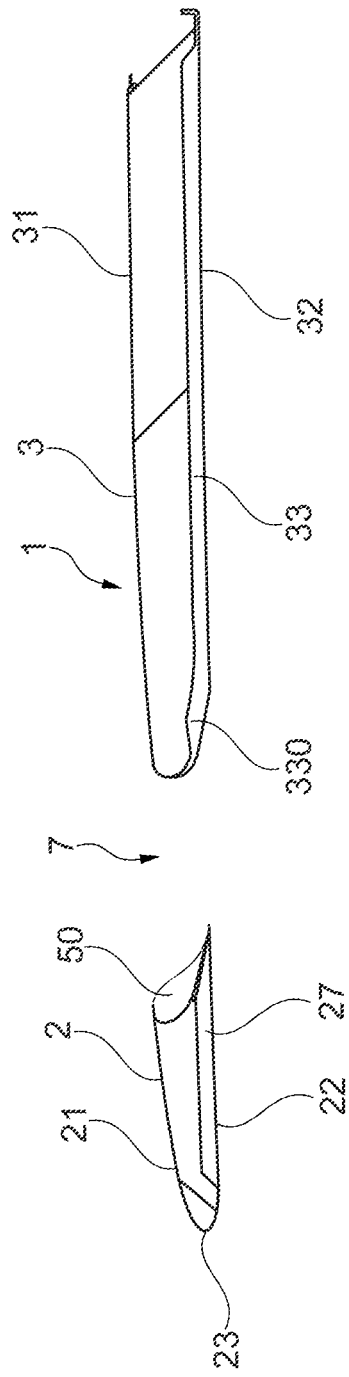
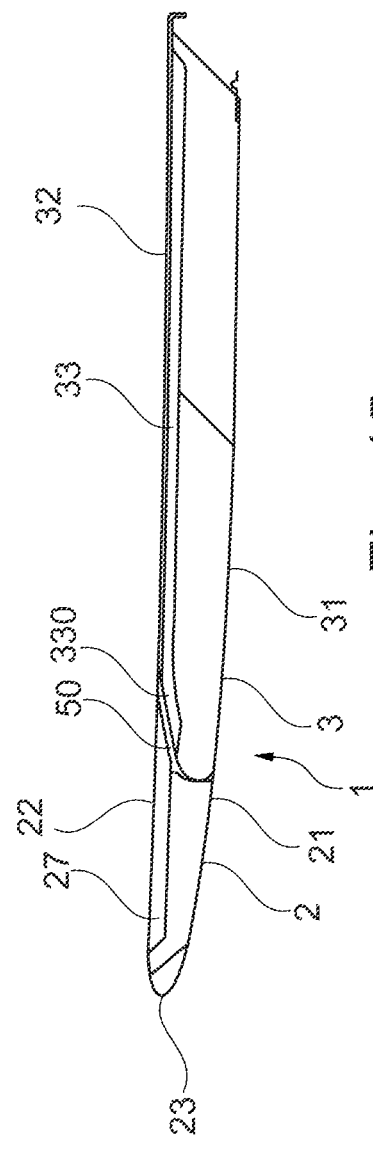

NACELLE FOR A TURBOFAN ENGINE

REFERENCE TO RELATED APPLICATION

This application claims priority to German Patent Application No. 10 2017 106 954.2 filed on Mar. 31, 2017, the entirety of which is incorporated by reference herein.

BACKGROUND

The invention relates to an engine nacelle for a turbofan engine.

In order to optimize the flow in an engine inlet, it is known to provide discrete door-like openings inside the nacelle wall via which the ambient air can flow from the outer side of the engine nacelle into the engine inlet. In this context, it is known from the military jet Tupolev TU-22 KD to design the inlet lip of the engine nacelle in an axially displaceable manner so as to provide a ring-shaped additional flow channel.

There is a need to provide an engine nacelle with a ring-shaped additional flow channel that has minimal flow losses.

SUMMARY

According to an aspect of the invention an engine nacelle is provided that comprises a nacelle wall that, in the area of the engine inlet, has a stationary downstream section and an upstream section that is displaceable in the axial direction. The displaceable upstream section is axially displaceable between a first upstream position and a second downstream position. A ring-shaped seal is provided that is formed between the stationary and the displaceable section of the nacelle wall. In the first position of the displaceable section, the engine nacelle forms a ring-shaped additional flow channel which extends from the outer skin of the nacelle wall to the engine inlet and via which ambient air can flow into the engine inlet. On the other side, the ring-shaped additional flow channel is closed in the second position of the displaceable section, wherein the stationary section, the ring-shaped seal and the displaceable section adjoin each other in the closed position. The displaceable section can also be located in axial positions that are between the first position and the second position.

Thus, aspects of the invention are based on the idea of optimizing the additional flow channel provided by the axially displaceable section of the nacelle wall by providing a ring-shaped seal between the stationary and the displaceable section of the nacelle wall. Through the ring-shaped seal, it is ensured that the stationary section and the displaceable section are safely sealed against each other in the second position of the displaceable section, when the additional flow channel is closed, so that no air can enter the engine inlet between the stationary and the displaceable section. Further, the ring-shaped seal makes it possible to cover sharp-edged structures of the nacelle wall and to provide an aerodynamically shaped additional flow channel which is provided with rounded structures. By both effects flow losses are minimized.

The downstream end of the additional flow channel ends in the engine inlet, i.e. upstream of the fan of the associated engine.

According to one embodiment of the invention, the ring-shaped seal is connected to the upstream end of the stationary section of the nacelle wall. In this manner, the ring-shaped seal can cover sharp-edged structures of the stationary section of the nacelle wall in an aerodynamically advantageous manner; if no ring-shaped seal was present, ambient air flowing through the additional flow channel would impinge on these sharp-edged structures. The ring-shaped seal can further provide a smooth and edge-free downstream boundary of the additional flow channel.

Alternatively, it can be provided that the ring-shaped seal is connected to the downstream end of the displaceable section of the nacelle wall. In that case, it provides a smooth and edge-free upstream boundary of the additional flow channel.

In alternative embodiments, it is in principle also possible to arrange a ring-shaped seal at the upstream end of the stationary section as well as at the downstream end of the displaceable section of the nacelle wall.

According to one embodiment of the invention, the ring-shaped seal is made of an elastic material. It may, for example, consist of a silicone rubber. However, other elastomers can also be used. The ring-shaped seal can further be embodied in a single piece, in which case it forms a single-piece sealing ring or can consists of multiple segments that respectively form a ring section and adjoin each other.

In a further embodiment of the invention, it is provided that the ring-shaped seal consists of one or multiple hollow chambers that adjoin each other. The hollow chambers can be filled with air or another gas. Each of the hollow chambers is formed in an elastic manner. According to one embodiment variant, the ring-shaped seal has at least one radially outer as well as a radially inner hollow chamber. Here, the radially outer hollow chamber delimits the additional flow channel adjoining the outer wall of the nacelle. The radially inner hollow chamber delimits the additional flow channel towards the engine inlet. Like the ring-shaped seal, the hollow chambers can in total extend in the circumferential direction over an angular range of 360° or over smaller angular ranges.

In one embodiment of the invention, the at least one hollow chamber is modulatable, i.e. its shape can be modified during operation. The shape can for example be adjusted based on the degree of the air or other gas that is filled in. Here, in one embodiment variant, the design can be adjusted depending on the axial position of the displaceable section. For example, the hollow chambers are more strongly inflated and provided with a larger volume if the displaceable section is in an upstream position. By contrast, the hollow chambers are less strongly inflated and provided with a smaller volume if the displaceable section is in the downstream position in which the stationary section, the ring-shaped seal and the displaceable section adjoin each other.

According to one embodiment of the invention, at its inner side, the displaceable section of the nacelle wall forms a downstream-projecting wall area. This wall area is positioned radially inside with respect to the ring-shaped seal. As it were, the wall area that protrudes downstream forms a projection that protrudes into the direction of the stationary area, or even abuts the same in the closed state of the additional flow channel. As a result, a smooth boundary of the engine inlet is ensured in the closed state of the additional flow channel.

In a corresponding manner, it can further be provided that, at its outer side, the stationary section of the nacelle wall forms an upstream-projecting wall area that and extends radially outside of the ring-shaped seal. Here, the upstream-projecting wall area forms a projection that protrudes in the direction of the displaceable section of the nacelle wall or even abuts the same in the closed state of the additional flow channel. Thus, a smooth outer boundary or outer skin of the engine nacelle is ensured in the closed state of the additional flow channel.

According to one embodiment of the invention, it is provided that the additional flow channel and the ring-shaped seal are embodied and formed in such a manner that the air discharged from the additional flow channel enters the engine inlet substantially in the axial direction. For this purpose, the additional flow channel extends substantially in the axial direction at its end that is facing towards the engine inlet. What is meant here by "substantially in the axial direction" is that the axial component of the extension direction is larger than the radial component of the extension direction. As a result, it is achieved that the air which is provided by the additional flow channel enters the flow path that is supplying air to the fan of the engine while generating only minor turbulences. In particular, the air that is provided by the additional flow channel forms a boundary flow that extends adjacent to the inner side of the nacelle wall, and in this manner prevents a flow separation of the flow inside the engine intake behind the inlet lip.

The axial adjustment of the displaceable section of the nacelle wall is realized by means of actuators. Here, it is provided in one embodiment of the invention that the stationary and the displaceable section of the nacelle wall can be displaced with respect to each other by means of a linear displacement device. For this purpose, it can for example be provided that the linear displacement device has multiple actuators that have respectively at least one linearly movable arm and are distributed along the circumference of the nacelle wall. According to one embodiment of the invention, at least three such actuators are provided.

The actuators may for example comprise a single-acting cylinder inside of which a piston rod can be linearly moved, for example by means of a hydraulic, pneumatic or electrical drive. At that, the cylinder is mounted in a stationary section of the nacelle wall and the end of the piston rod is mounted at the displaceable section of the nacelle wall. Here, it can be provided that the cylinder is constructed as a telescopic cylinder with multiple cylinders that are built into each other.

However, this is only one of a plurality of possible exemplary embodiments for realizing the displaceability of the displaceable section. In alternative exemplary embodiments, a thread mechanism or a rack-and-pinion arrangement is provided for this purpose. Further, it can be provided that a plurality of separate actuators is provided (that may for example be driven in a hydraulic, pneumatic or electrical manner), the movement of which may be synchronized, or that only one actuator controlling a plurality of synchronized adjustment elements is provided.

If a thread mechanism or a rack-and-pinion arrangement is used, it is preferably realized with a self-retention mechanism, whereby a separate security system for securing the attachment of the displaceable section at the nacelle wall can be foregone.

According to a further embodiment of the invention, it is provided that the displaceable section of the nacelle wall is not only displaceable in the axial direction with respect to the stationary section of the nacelle wall, but is also tiltable. What can be realized in this manner—analogously to a thrust vectoring in the area of the thrust nozzle—is a vector control with respect to the [sucked in] air. As a result, it is, for example, possible to optimize the flow inside the engine inlet even in the event of cross winds or during ascent. Here, tilting of the displaceable section of the nacelle wall with respect to the stationary section of the nacelle wall can in principle be realized in both spatial directions extending perpendicularly to the axial direction (also about the yaw axis and/or the transverse axis).

In one embodiment of the invention, in order to realize a tilting of the displaceable section of the nacelle wall, it is provided that the extendible arms of the actuators of the linear displacement device are extended to a different extent. If the arms are extended to the same extent, only a linear movement is present. If the arms are extended to a different extent, tilting about the yaw axis and/or about the transverse axis of the engine can be achieved.

It is to be understood that the ring-shaped seal does not necessarily have to be formed in a circular manner. In the axial view, the circumferential line may by all means deviate from the ideal circular shape and thus from the strict axial symmetry so as to be always able to locally provide an ideal adjustment to the nacelle wall as well as optimized flow conditions. Considered as ring-shaped is any body that is curved in space and self-contained. Preventively, it is also pointed out that the ring-shaped seal does by no means have to have a circular cross-sectional surface.

In a further embodiment of the invention, it is provided that at least the stationary downstream section of the nacelle wall is provided with a sound-absorbing cladding adjacent to the engine inlet, i.e. at its inner side. In addition, the displaceable section of the nacelle wall can also be provided with a sound-absorbing cladding at its inner side. As a result, the emission of engine noise is reduced.

It is to be understood that the nacelle wall forms different axially extending sections that can be formed by different structural components. Naturally, this applies to the displaceable section of the nacelle wall. However, also the stationary section of the nacelle wall can comprise different sections that are formed by different structural components. For example, it can be provided that, adjacent to the inlet lip, the nacelle wall is formed by an inlet cladding to which a fan housing connects in the flow direction. Within the meaning of the present invention, the term nacelle wall may comprise any wall structure of the engine nacelle and is not limited to certain sections. Correspondingly, within the meaning of the present invention, the inlet lip is also a part of the nacelle wall. Here, the inlet lip is that structural part of the nacelle wall that forms the upstream end of the engine nacelle.

In one embodiment of the invention, it is provided that the displaceable section of the engine nacelle is formed by the inlet lip. According to this embodiment variant, the inlet lip is thus formed so as to be displaceable in the axial direction. The inlet lip is arranged at the upstream end of the nacelle wall and forms the front edge of the engine nacelle. In principle, the displaceable section can also begin at a section of the nacelle wall that is located further downstream.

In principle, the present invention is suitable for being used in turbofan engines designed for subsonic operation as well as for being used in turbofan engines that are designed for supersonic operation. According to one embodiment of the invention, the engine nacelle according to the invention is thus realized in a turbofan engine that is used in a civilian or military supersonic aircraft. In this case, the engine inlet is formed as a supersonic inlet, with a tapering inlet lip being formed.

It is to be understood that the present invention is described with respect to a cylindrical coordinate system, having the coordinates x, r and $\varphi$. Here, x indicates the axial direction, r indicates the radial direction, and $\varphi$ indicates the angle in the circumferential direction, with the axial direction being identical to the machine axis of the turbofan engine. Beginning at the x-axis, the radial direction points radially outward. Terms such as "in front", "behind", "frontal" and "rear" always refer to the axial direction or the flow direction inside the engine. Thus, the term "in front" means "upstream", and the term "behind" means "downstream". Terms such as "outer" or "inner" always refer to the radial direction.

In further aspects, the invention relates to a turbofan engine with an engine inlet according to the invention and a civilian or military aircraft, in particular a supersonic aircraft having such a turbofan engine.

BRIEF DESCRIPTION OF THE DRAWINGS

The invention will be explained in more detail on the basis of exemplary embodiments with reference to the accompanying drawings in which:

FIG. 14 shows an alternative exemplary embodiment of an engine nacelle in which a ring-shaped seal is arranged at the downstream end of an axially displaceable inlet lip, wherein the inlet lip is shown in an upstream position in which it opens an additional flow channel; and FIG. 15 shows the exemplary embodiment of FIG. 14, wherein the axially displaceable inlet lip is shown in a downstream position in which the additional flow channel is closed.

DETAILED DESCRIPTION

Figure 1:
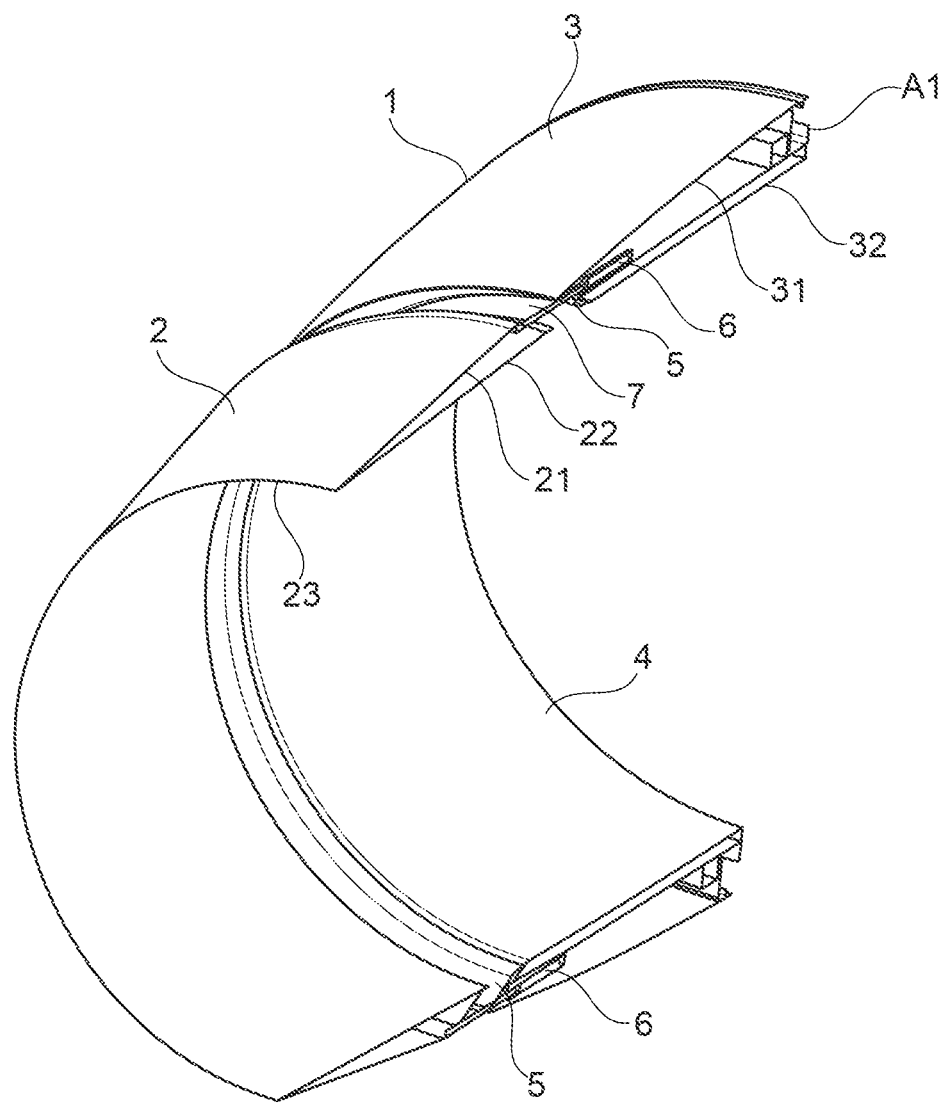
FIG. 1 shows, in a perspective and partially sectioned view, an exemplary embodiment of the axially frontal components of an engine nacelle that forms a stationary section, a ring-shaped seal and an axially displaceable inlet lip, wherein the inlet lip is shown in an upstream position in which it opens an additional flow channel.

FIG. 1 shows the axially frontal components of an engine nacelle of a turbofan engine that is provided and suitable for being used in a civilian or military supersonic aircraft, and is correspondingly designed for operating conditions in the subsonic range, in the transsonic range, and in the supersonic range. However, it is to be understood that the principles of the present invention can be realized in the same manner in a turbofan engine that is designed exclusively for supersonic operation. Therefore, the description of the invention in the context of an engine nacelle of an engine provided for supersonic aircraft is to be understood merely as an example.

Before the engine nacelle and the engine inlet formed by the same are discussed in more detail, it is pointed out that the turbofan engine arranged in the engine nacelle can comprise a fan in a per se known manner, with the fan being embodied with multiple stages, a primary flow channel leading to a core engine, and a secondary flow channel or bypass channel leading past the core engine.

The core engine has a compressor, a combustion chamber, and a turbine. For example, the compressor comprises a high-pressure compressor and a low-pressure compressor, wherein a low-pressure compressor can be formed by the areas of the fan that are located close to the hub. The turbine that is arranged behind the combustion chamber comprises a high-pressure turbine and a low-pressure turbine. The high-pressure turbine drives a high-pressure shaft that connects the high-pressure turbine to the high-pressure compressor. The low-pressure turbine drives a low-pressure shaft that connects the low-pressure turbine to the fan. According to an alternative embodiment, the turbofan engine can additionally comprise a medium-pressure compressor, a medium-pressure turbine, and a medium-pressure shaft.

What is further provided is a mixer that mixes the air of the secondary flow channel and of the primary flow channel behind the core engine. Behind the mixer, the engine forms a flow channel extending through a thrust nozzle. In addition, an afterburner and/or a thrust reverser can be optionally provided.

The turbofan engine comprises a machine axis or engine central line. The machine axis defines an axial direction of the turbofan engine. A radial direction of the turbofan engine extends perpendicular to the axial direction.

According to FIG. 1, the shown frontal components of the engine nacelle comprise a nacelle wall 1 that comprises an inlet lip 2 and an inlet cladding 3. At that, the inlet cladding 3 represents a stationary downstream section of the nacelle wall 1, and the inlet lip 2 represents an upstream section of the nacelle wall 1 that is displaceable in the axial direction.

The inlet cladding 3 comprises an outer side 31 and an inner side 32. The inlet lip 2 comprises an outer side 21 and an inner side 22. It forms a front edge 23 of the inlet lip 2 and of the engine nacelle as a whole. The outer side 31 of the inlet cladding 3 and the outer side 21 of the inlet lip 2 form the outer side of the nacelle wall 1. Likewise, the inner side 32 of the inlet cladding 3 and the inner side 22 of the inlet lip form the inner side of the nacelle wall 1. At that, the inner side 22, 32 of the nacelle wall 1 delimits an engine inlet 4 of the engine nacelle that takes in the air required by an associated engine, and supplies it to the fan.

Connecting downstream to the shown components 2, 3 of the engine nacelle in a per se known manner are components of the engine nacelle that are not shown. For example, it can be provided that a fan housing connects downstream of the inlet cladding 3. Such a fan housing is typically connected to the inlet cladding 3 by means of a flange connection, which is also referred to as an A1 connection.

The engine inlet 4 is embodied as a supersonic inlet that reduces a supersonic inflow inside the inlet to a subsonic speed level with which the subsequent fan and compressor are impinged. At that, the engine inlet 4 or the inlet lip 2 and the inlet cladding 3 which delimit the engine inlet 4 can be embodied in various different manners, for example as a supersonic inlet with internal compression, with external compression, or with mixed compression. It can also be provided that the engine nacelle is embodied in a beveled manner so as to achieve a favorable compression shock configuration during supersonic flight. In this respect, too, the exemplary embodiment shown in the Figures is to be understood merely as an example.

The inlet lip 2 is arranged so as to be displaceable with respect to the inlet cladding 3 in the axial direction. To realize this, the engine nacelle comprises a plurality of actuators 6 by means of which the inlet lip 2 can be moved in the axial direction with respect to the inlet cladding 3. The exact structure of the actuators 6 will be described by referring to FIG. 3. In FIG. 1, two such actuators 6 are shown. Typically, the engine inlet has at least three, for example five to nine, such actuators 6.

FIG. 1 shows the inlet lip 2 in a first position in which it is maximally displaced in the upstream direction. In this position, an additional flow channel 7 is opened between the inlet cladding 3 and the inlet lip 2, which extends from the outer skin of the nacelle wall 1 to the engine inlet 4, and through which ambient air can flow from the outer side of the engine nacelle into the engine inlet 4.

The engine nacelle further comprises a ring-shaped seal 5 that is formed between the stationary section and the displaceable section of the nacelle wall 1, that is, between the inlet cladding 3 and the inlet lip 2. The ring-shaped seal 5 can be made of an elastic material, for example a silicone rubber. It is connected to the upstream end of the inlet cladding 3, thus forming the downstream boundary of the additional flow channel 7.

Figure 2:
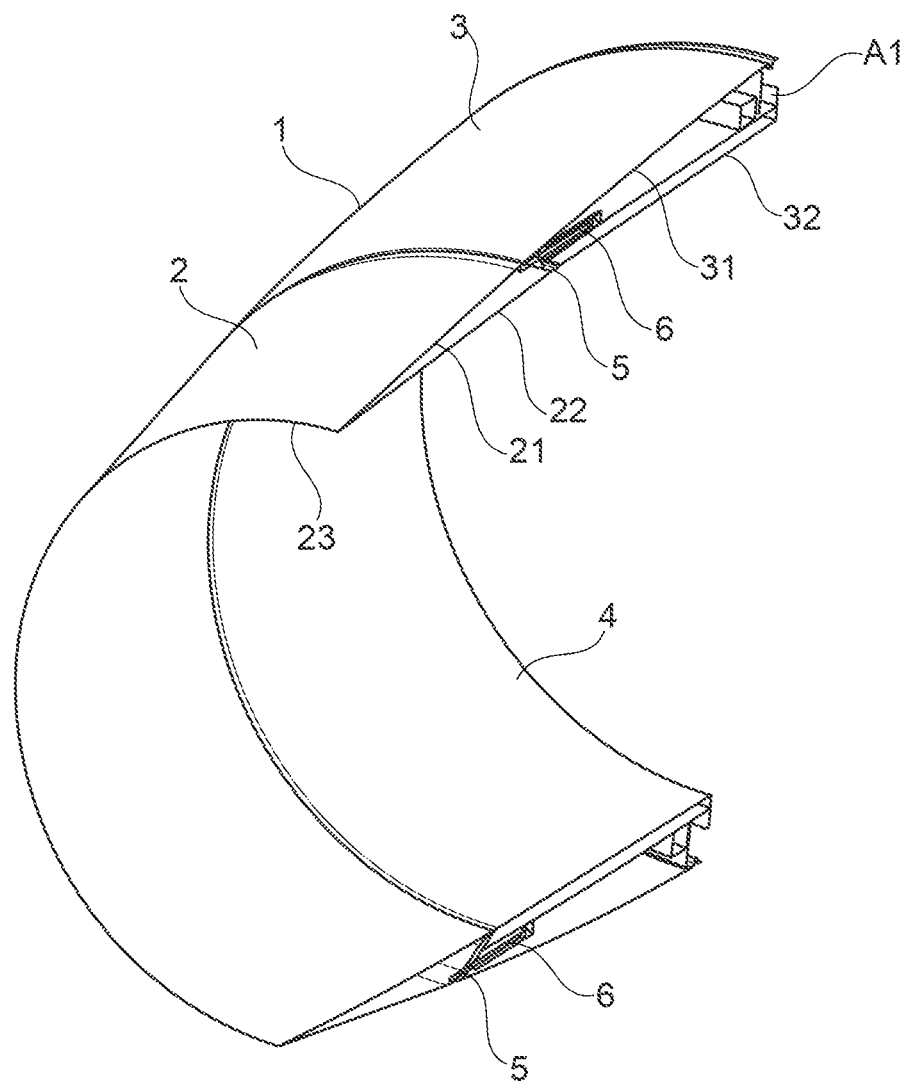
FIG. 2 shows the engine nacelle of FIG. 1, wherein the axially displaceable inlet lip is shown in a downstream position in which the additional flow channel is closed.

FIG. 2 shows the engine nacelle of FIG. 1 in a configuration in which the inlet lip 2 is in a second downstream position. In this position, the ring-shaped additional flow channel 7 is closed. The inlet lip 2, the ring-shaped seal 5 and the inlet cladding 3 abut each other. Through the ring-shaped seal 5, it is ensured that no air can flow from the outer skin of the nacelle wall 1 into the engine inlet 4 in the shown configuration.

Figure 3:
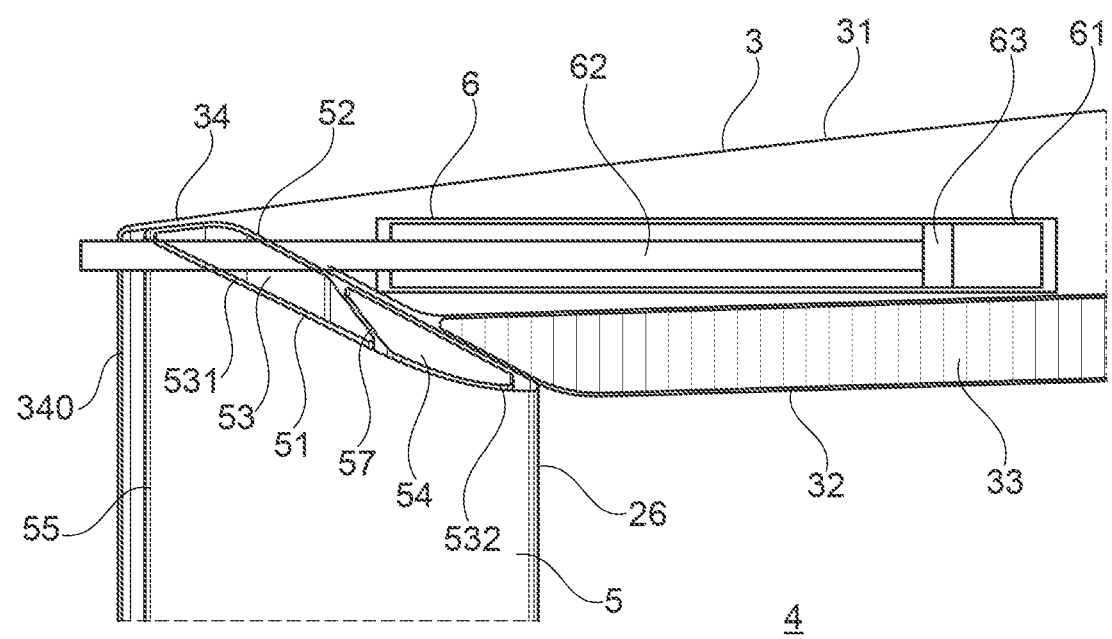
FIG. 3 shows an enlarged partially sectioned view of the stationary section and the ring-shaped seal of the engine nacelle of FIGS. 1-2.

FIG. 3 shows, in a partially sectioned longitudinal section, the design of the ring-shaped seal 5, the actuators 6 and their arrangement at/in the inlet cladding 3 in more detail.

The ring-shaped seal 5 forms an upstream obliquely extending wall area 51 that forms the downstream boundary of the additional flow channel 7 (cf. FIG. 1). It further comprises a downstream obliquely extending wall area 52 that is connected to neighboring wall structures (not separately shown) of the inlet cladding 3, for example via screw connections or rivet connections and/or adhesive connections.

Further, the ring-shaped seal 5 includes an upstream edge 340 and two hollow chambers 53, 54, a radially outer hollow chamber 53 and a radially inner hollow chamber 54. The two hollow chambers 53, 54 are separated from each other by a wall area 57. The hollow chambers 53, 54 may for example be filled with air or another gas. The hollow chamber 53 forms a wall 531 towards the additional flow channel, and the hollow chamber 54 forms a wall 532 towards the additional flow channel. Here, the walls 531, 532 form the upstream wall area 51.

With the ring-shaped seal 5 being formed by hollow chambers 53, 54, the weight of the ring-shaped seal 5 is reduced. At the same time, it becomes possible to adjust the elasticity of the ring-shaped seal 5 based on the wall thickness and the material of the hollow chambers.

In one embodiment variant, it can be provided that the shape of the hollow chambers 53, 54 is adjusted by the different filling degree of the hollow chambers 53, 43 with air/gas depending on the axial position of the displaceable section 2. As a result, a further optimization of the aerodynamic characteristics of the ring-shaped seal 5 can be achieved independently of the operational state.

The shown formation of the ring-shaped seal by two hollow chambers is to be understood merely as an example. Alternatively, a larger number of hollow chambers can be provided. Further, it is to be understood that alternatively it can principally also be provided that the ring-shaped seal is formed as a massive part, that is, without any hollow chambers.

In any case, the ring-shaped seal 5 has a smooth and edge-free shape along the upstream wall area 51 that adjoins the additional flow channel. As a result, turbulences and flow losses in the additional flow channel are minimized.

Here, it is provided that the ring-shaped seal 5 has an increasing axial orientation in the direction of the engine inlet 4 in the area of the radially inner hollow chamber 54, so that air entering the engine inlet 4 from the additional flow channel is guided into the engine inlet 4 with a substantially axial component. This will be described in more detail with respect to FIG. 7.

FIG. 3 further shows the actuator 6 for the axial displacement of the inlet lip 2. The actuator 6 comprises a single-acting cylinder 61 in which a piston rod 62 with a piston surface 63 is arranged in a linearly displaceable manner. At that, a displacement of the piston rod 62 can be effected by means of a hydraulic, pneumatic or electrical means. The cylinder 61 is mounted in the inlet cladding 3. The piston rod 62 projects from the inlet cladding 3, and is connected at its end to the inlet lip, as will be explained based on FIGS. 4-6.

At its outer side 31, the inlet cladding 3 forms a wall area 34 that protrudes upstream and delimits the ring-shaped seal 5 radially outside. The function achieved in this way will be explained based on FIG. 5.

Further, it is to be understood that the inlet cladding 3 has a sound-absorbing cladding 33 adjacent to the inner side 32 to reduce nose generation of the engine. Such a sound-absorbing cladding can also be provided at the inner side of the inlet lip 2.

Figure 4:
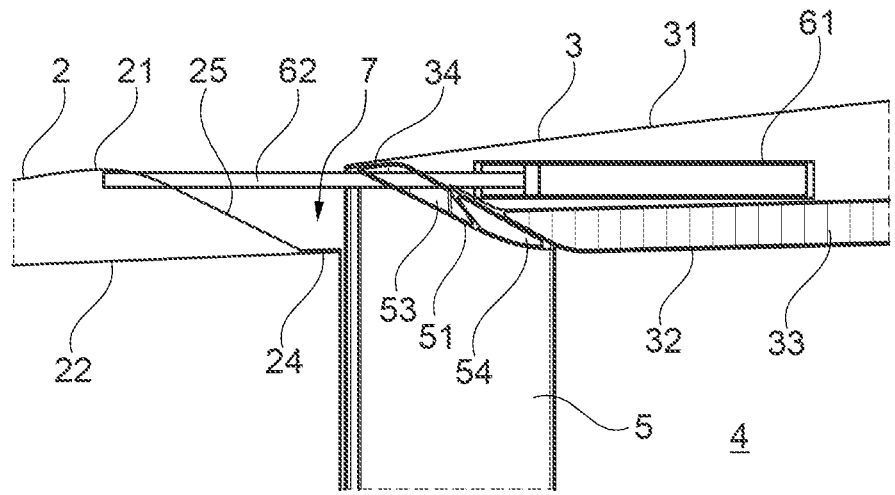
FIG. 4 shows a partially sectioned view of the stationary section, the ring-shaped seal and the inlet lip in an extended position of the inlet lip.
Figure 5:
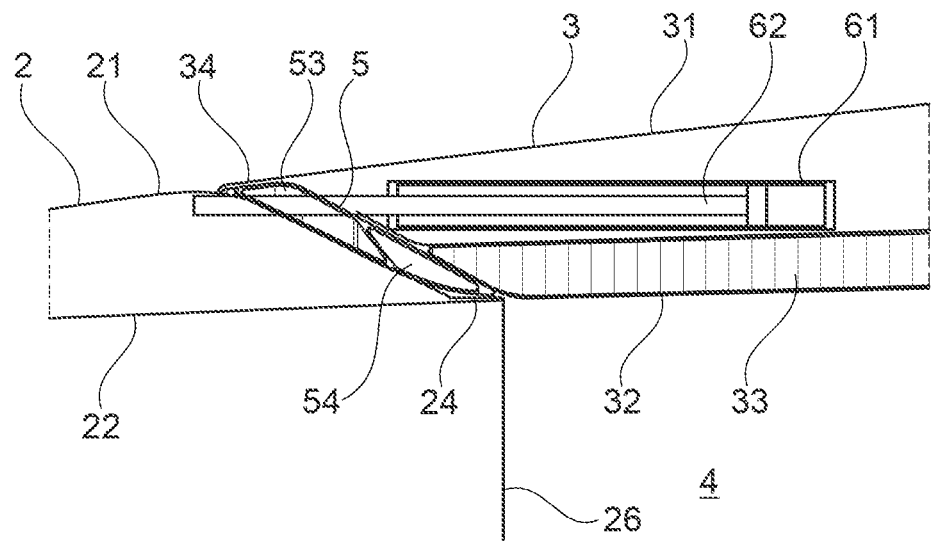
FIG. 5 shows a partially sectioned view of the stationary section, the ring-shaped seal and the inlet lip in a retracted position of the inlet lip.
Figure 6:
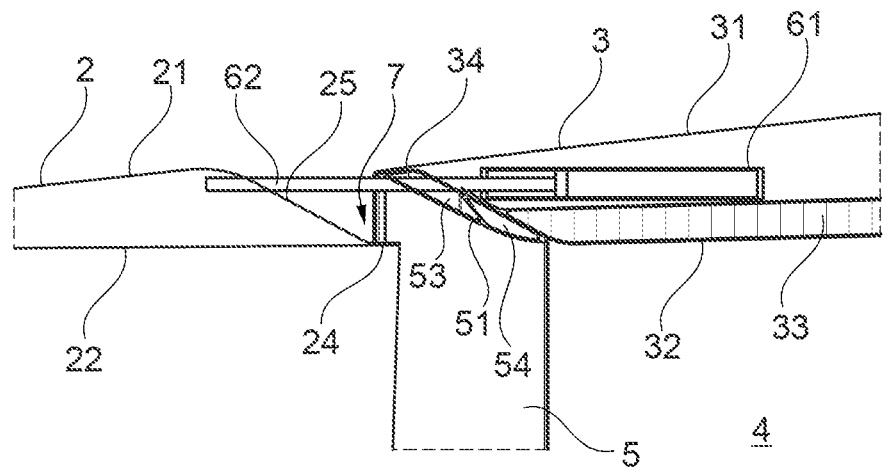
FIG. 6 shows a partially sectioned view of the stationary section, the ring-shaped seal and the inlet lip in a middle position of the inlet lip.

FIGS. 4 to 6 show, in a rendering that corresponds to the rendering of FIG. 3, the engine nacelle with three different axial positions of the inlet lip 2. Here, FIG. 4 shows the inlet lip 2 in the first upstream position (corresponding to FIG. 1). FIG. 5 shows the inlet lip 2 in the second downstream position (corresponding to FIG. 2). FIG. 6 shows the inlet lip 2 in a position that is located between the first and the second position. In contrast to FIG. 3, FIGS. 4 to 6 also show the inlet lip 2. The end of the piston rod 62 is fixedly connected to the downstream end of the inlet lip 2, so that an axial displacement of the inlet lip 2 can be achieved by means of a displacement of the piston rod 62 (or the piston rods 62 of multiple actuators 6 arranged along the circumference of a cladding 3).

At its downstream end, the inlet lip 2 forms an obliquely extending boundary wall 25 that forms the upstream boundary of the additional flow channel 7. The ring-shaped seal 5 forms the downstream boundary of the additional flow channel 7. Further, at its inner side 22, the inlet lip 2 forms a wall area 24 that is projecting downstream and extends in the direction of the inlet cladding 3. The function thus achieved will be explained based on FIG. 5.

In the configuration of FIG. 4, the additional flow channel 7 is opened to a maximum, so that ambient air can flow to a maximum extent into the engine inlet 4 from the outer skin of the nacelle wall.

By contrast, in the configuration of FIG. 5, the additional flow channel is closed. Here, the inlet lip 2 and the inlet cladding 3 both directly abut the ring-shaped seal 5. Through the projecting wall areas 24, 34, which respectively protrude beyond the ring-shaped seal 5 and extend in the direction of the respectively other wall section, it is achieved that the outer side and the inner side of the nacelle wall are formed in a smooth manner in the closed state of the additional flow channel.

As can further be seen in FIG. 5, the projecting wall area 24 of the inlet lip forms a rear edge 26 of the inlet lip 2.

In the configuration of FIG. 6, the additional flow channel 7 is partially opened. The size of the additional flow channel 7 and thus of the air flow through the additional flow channel 7 into the engine inlet 4 can be controlled and adjusted via the axial position of the inlet lip 2.

Figure 7:
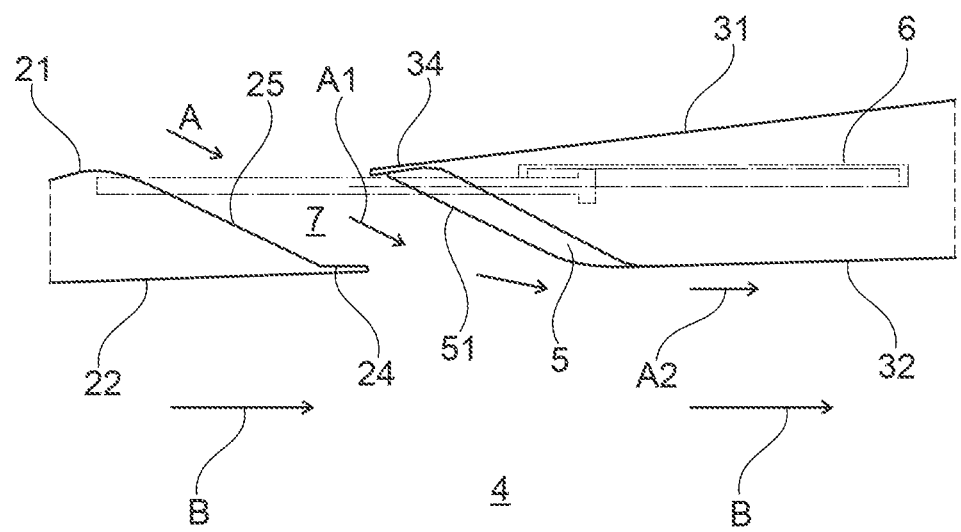
FIG. 7 shows a longitudinal section of the engine nacelle of FIGS. 1-6, also schematically showing the flow inside the additional flow channel.

FIG. 7 shows, in a sectional view and in a schematic manner, the flow through the additional flow channel 7. Ambient air A is guided into the flow channel 7 and flows inside it with a radially inwardly directed and axial directional component according to the arrow A1. Here, the additional flow channel 7 is formed in such a manner that it extends increasingly in the axial direction in the direction of the engine inlet 4, so that the axial component of the flow successively increases in the additional flow channel 7, and the flow extends in the axial direction or approximately in the axial direction at the exit of the additional flow channel 7 corresponding to arrow A2. For one thing, this is achieved through a curved orientation of the wall area 51 of the ring-shaped seal 5, which extends increasingly in the axial direction towards the engine inlet 4. For another thing, the projecting wall area 24 blocks radially extending flow components in the additional flow channel 7.

Thus, the inflowing ambient air A2 forms a boundary flow inside the engine inlet 4 at the exit of the additional flow channel 7, extending adjacent to the inner side 32 of the nacelle wall and thus avoiding or reducing the flow separation of the flow B inside the engine inlet 4 behind the inlet lip 2.

Figure 8:
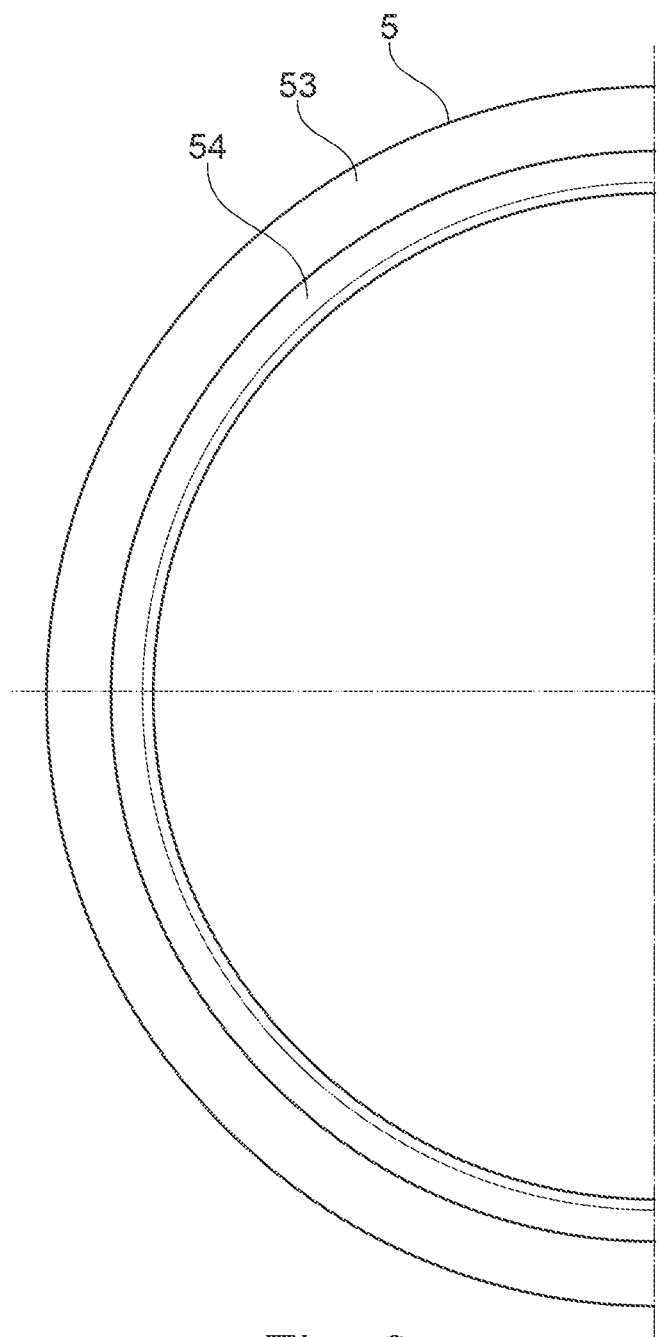
FIG. 8 shows, in a front view, the ring-shaped seal of the engine nacelle of FIGS. 1-7, wherein the ring-shaped seal is shown over an angular range of 180°.

FIG. 8 shows, in a view from the front, the ring-shaped seal 5 of the preceding Figures. As has already been explained, the seal comprises a radially outer hollow chamber 53 and a radially inner hollow chamber 54. The seal 5 can be formed in one piece and extend over an angular range of 360°. Alternatively, it can consist of multiple ring segments of for example 180°, 90°, 45° or 30° that are arranged adjoining each other in the circumferential direction. The provision of the seal comprised of multiple ring segments can be advantageous with respect to manufacturing costs and maintenance costs.

Figure 9:
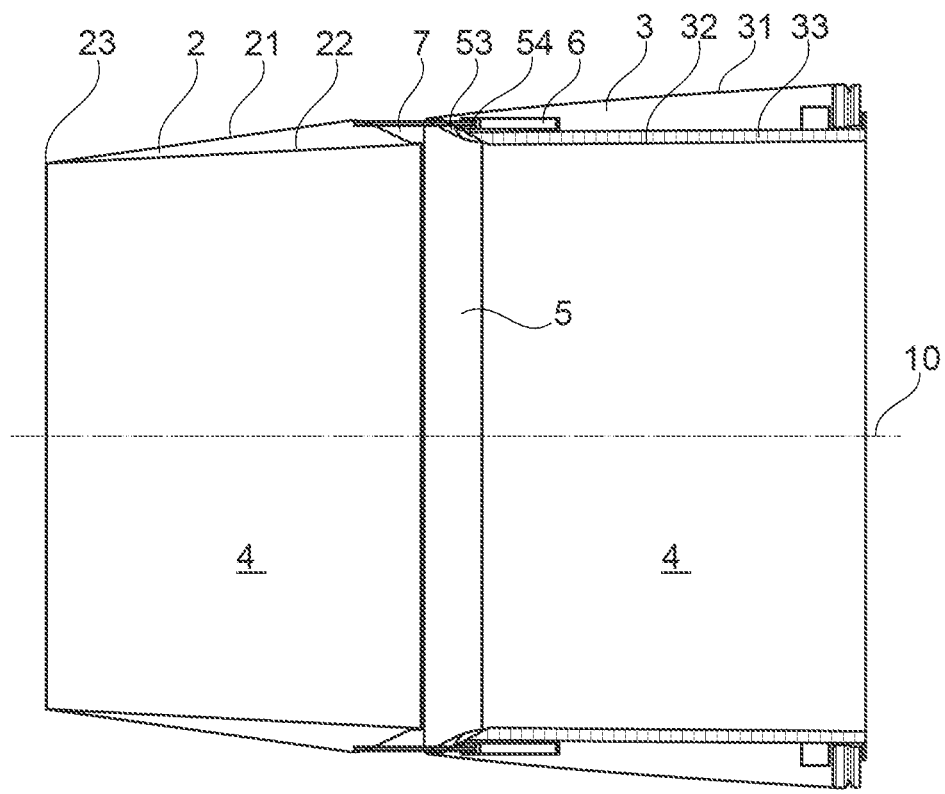
FIG. 9 shows a longitudinal section of the whole engine nacelle in an extended position of the inlet lip.
Figure 10:
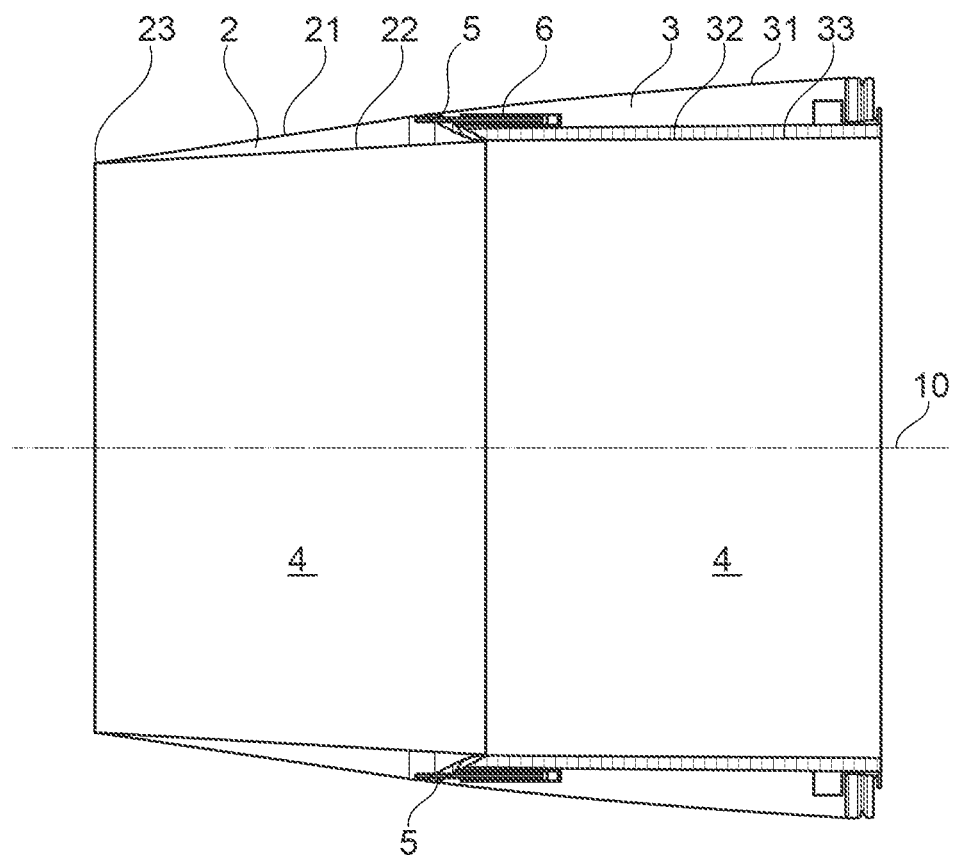
FIG. 10 shows a longitudinal section of the whole engine nacelle in a retracted position of the inlet lip.

FIGS. 9 and 10 show two longitudinal sections of the engine nacelle, wherein FIG. 9 shows the inlet lip 2 in the upstream position (corresponding to FIG. 1) and FIG. 10 shows the inlet lip in the downstream closed position (corresponding to FIG. 2). At that, FIGS. 9 and 10 also show the machine axis 10 of the associated engine.

Figure 11:
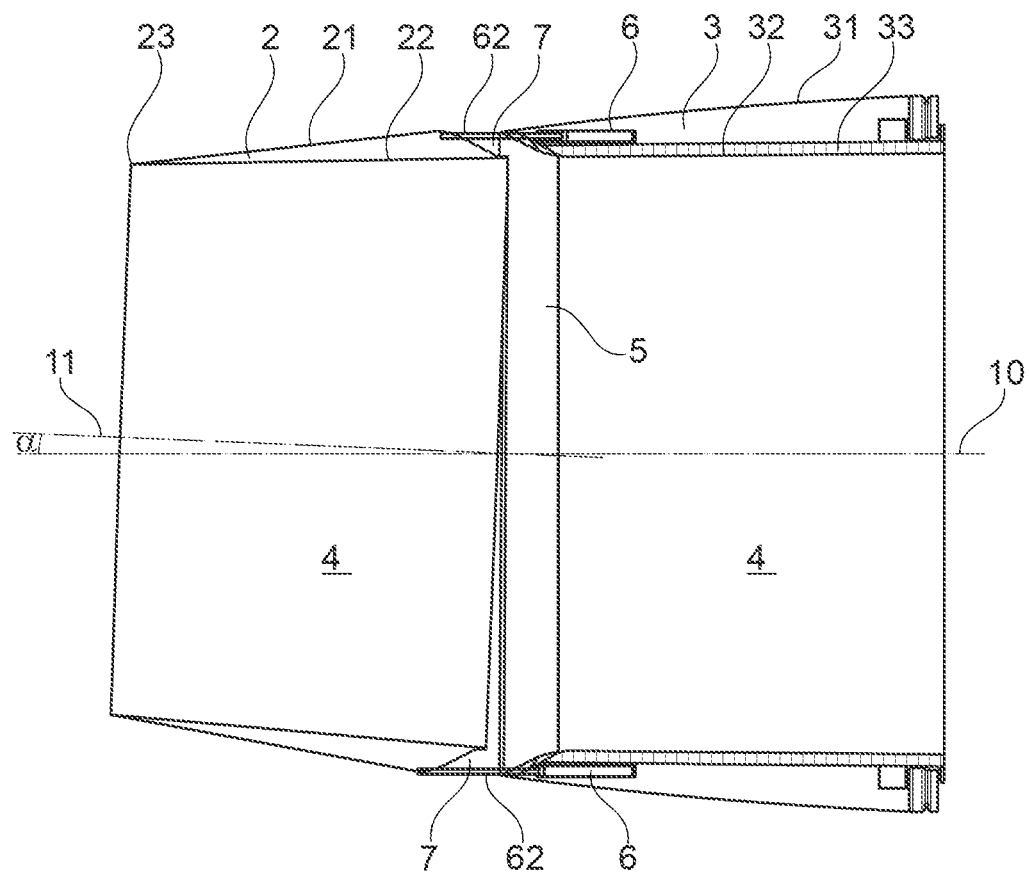
FIG. 11 shows a longitudinal section of the whole engine nacelle, with the inlet lip being tilted about the inflow axis.

FIG. 11 shows a longitudinal section of the engine nacelle in which the inlet lip 2 is tilted with respect to the inlet cladding 3. What is thus present is a tilting of the inflow axis 11 with respect to the machine axis 10 by an angle α. Here, the inlet lip 2 is tilted about the transverse axis of the engine. Alternatively or additionally, also a tilting about the vertical axis (yaw axis) can be present. While in FIGS. 1-10, the inflow axis 11 is thus identical with the machine axis 10, it differs from the machine axis 10 in the exemplary embodiment of FIG. 11.

Figure 12:
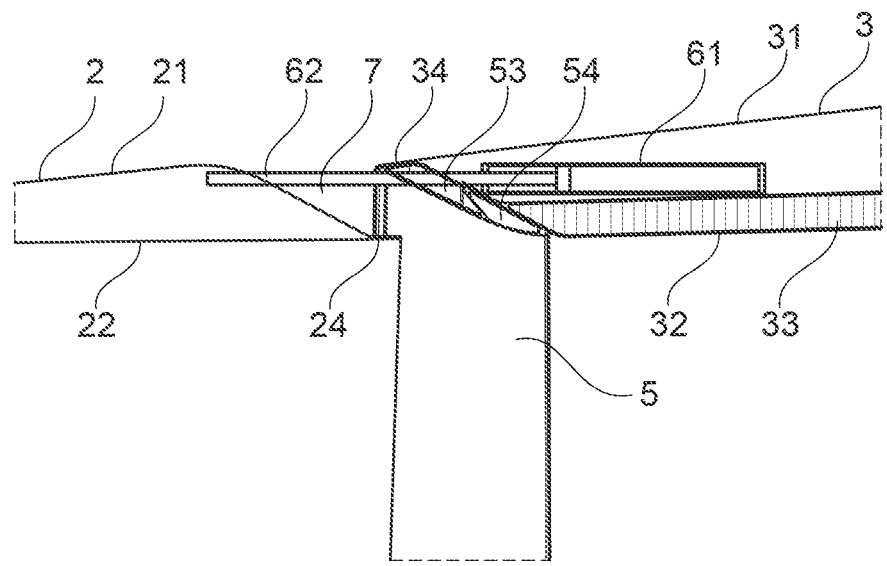
FIG. 12 shows, in partially sectioned view, the vertically upper part of the engine nacelle, with the inlet lip being tilted according to FIG. 11.
Figure 13:
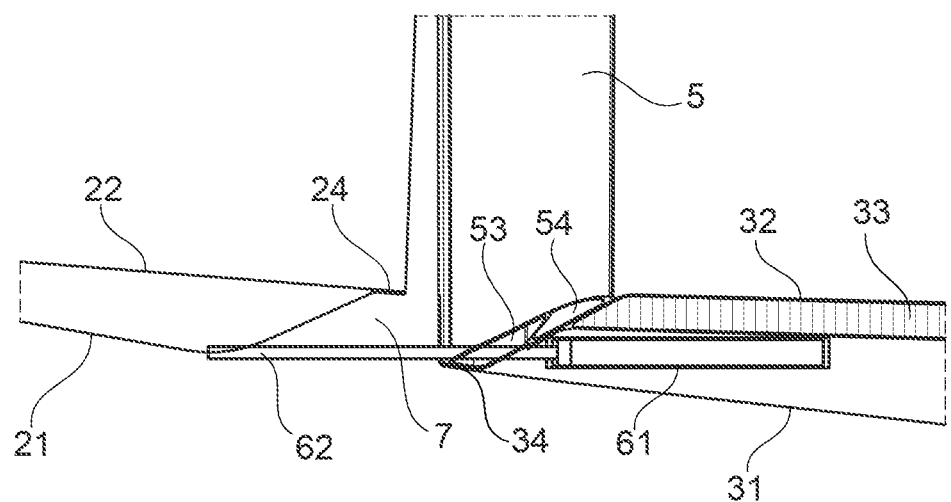
FIG. 13 shows, in partially sectioned view, the vertically lower part of the engine nacelle, with the inlet lip being tilted according to FIG. 11.

This is achieved by the actuators 6 extending the respective piston rod 62 to a different extent. Thus, in FIG. 11, the piston rod 62 is extended further in the actuator 6 shown at the bottom than in the actuator 6 shown at the top. This is additionally shown in an enlarged manner in the renderings of FIGS. 12 and 13. Tilting about the transverse axis and/or about the vertical axis of the engine can be carried out by correspondingly different movements of the piston rod 62.

FIGS. 14 and 15 show an exemplary embodiment in which the ring-shaped seal is not arranged at the upstream end of the stationary section, as is the case in FIGS. 1-13, but rather at the downstream end of the displaceable section. The basic structure corresponds to the FIGS. 1-13. The nacelle wall 1 comprises an inlet lip 2 and an inlet cladding 3. The inlet cladding 3 represents a stationary downstream section of the nacelle wall 1, and the inlet lip 2 represents an upstream section of the nacelle wall 1 that is displaceable in the axial direction. The adjustment actuators provided for that purpose are not shown. They can be embodied corresponding to the actuators of FIGS. 1 to 13.

The inlet cladding 3 comprises an outer side 31 and an inner side 32. The inner side 32 is provided with a sound-absorbing cladding 33. The inlet lip 2 comprises an outer side 21 and an inner side 22. The inner side 22 is also provided with a sound-absorbing cladding 27. The inlet lip 2 forms the front edge 23 of the engine nacelle.

In the rendering of FIG. 14, the inlet lip 2 is positioned in the axially frontal position, so that a ring-shaped additional flow channel 7 is formed between the inlet lip 2 and the inlet cladding 3.

A ring-shaped seal 50 is provided, which is attached at the downstream end of the inlet lip 2 and consists of an elastic material. Here, the ring-shaped seal 50 forms an aerodynamically smooth surface for air flowing into the engine inlet through the additional flow channel 7. In principle, the ring-shaped seal 50 can be constructed corresponding to the ring-shaped seal 5 of FIGS. 1-13, i.e. it may for example comprise one or multiple inflatable chambers.

Due to the arrangement of the ring-shaped seal 50 at the inlet lip 2, it is possible and provided that the sound-absorbing cladding 33 of the inlet cladding 3 is pulled stronger into the additional flow channel 7. Thus, it forms a section 330 that adjoins the additional flow channel 7.

FIG. 15 shows the inlet lip 2 in the axially rear position when the additional flow channel is closed and the inlet lip 2, the ring-shaped seal 50 and the inlet cladding 3 adjoin each other.

FIGS. 14 and 15 additionally illustrate the realization of a further, optional feature of the ring-shaped seal 50. Thus, it is provided that the ring-shaped seal 50 is modulatable with respect to its shape, and namely independently of the operational state or the axial position of the inlet lip 2. Such a modulatability may for example be provided by the filling degree of the hollow chambers of the inlet lip. FIG. 14 shows the ring-shaped seal 50 in the maximally inflated state or with a maximal volume. Here, it creates an aerodynamically smooth surface at the upstream end of the additional flow channel 7. In contrast, FIG. 15 shows the ring-shaped seal 50 in a minimally inflated state or with a minimal volume, wherein it can be arranged in an easily stowable manner between the inlet lip 2 and the inlet cladding 3.

The present invention is not limited to the previously described exemplary embodiments. For example, the specific shape and the structural embodiment of the ring-shaped seal are to be understood merely as examples. Also, it is to be understood that the displaceable section of the nacelle wall does not necessarily have to be formed by the inlet lip. For example, it can alternatively be provided that the inlet cladding has two axially successive sections, of which the one is connected to the fan housing and the other is connected to the inlet lip, wherein an axial displaceability between these two sections is realized.

It is furthermore pointed out that the features of the individually described exemplary embodiments of the invention can be combined in various combinations with one another. Where areas are defined, they include all the values within these areas and all the sub-areas falling within an area.

What is claimed is:

1. An engine nacelle for a turbofan engine, comprising:
   a nacelle wall comprising an inner side and an outer side, wherein the nacelle wall comprises an inlet lip that is formed at an upstream end of the engine nacelle,
   an engine inlet that takes in air that is required for an associated engine and is delimited by the inner side of the nacelle wall,
   wherein the nacelle wall includes a stationary downstream section and a displaceable upstream section that is displaceable in an axial direction, the displaceable upstream section being displaceable between a first upstream position and a second downstream position, and
   a ring-shaped seal formed between the stationary downstream section and the displaceable upstream section, wherein
   in the first upstream position, the engine nacelle forms a ring-shaped additional flow channel with an opening to the outer side positioned in the nacelle wall axially between an upstream portion of the stationary downstream section and a downstream portion of the displaceable upstream section, the ring-shaped additional flow channel extending from the outer side of the nacelle wall, through the opening, to the engine inlet and via which the air flows into the engine inlet, and
   in the second downstream position, the ring-shaped additional flow channel is closed, wherein the upstream portion of the stationary downstream section directly abuts a downstream portion of the ring-shaped seal and the downstream portion of the displaceable upstream section directly abuts an upstream portion of the ring-shaped seal such that the ring-shaped seal is positioned axially between the upstream portion of the stationary downstream section and the downstream portion of the displaceable upstream section;
   wherein the ring-shaped seal forms the downstream boundary of the additional flow channel.

2. The engine nacelle according to claim 1, wherein the ring-shaped seal is connected to an upstream end of the stationary downstream section.

3. The engine nacelle according to claim 1, wherein the ring-shaped seal is connected to a downstream end of the displaceable upstream section.

4. The engine nacelle according to claim 1, wherein the ring-shaped seal is made of an elastic material.

5. The engine nacelle according to claim 1, wherein the ring-shaped seal is embodied in one piece and forms a sealing ring.

6. The engine nacelle according to claim 1, wherein the ring-shaped seal includes at least one hollow chamber.

7. The engine nacelle according to claim 6, wherein the at least one hollow chamber is modifiable with respect to a shape during operation by setting a filling degree thereof.

8. The engine nacelle according to claim 7, wherein the shape of the at least one hollow chamber and thus the shape of the ring-shaped seal is adjustable depending on an axial position of the displaceable upstream section.

9. The engine nacelle according to claim 8, wherein the at least one hollow chamber has a larger volume when the displaceable upstream section is located in the first upstream position, and has a smaller volume when the displaceable upstream section is placed in the second downstream position.

10. The engine nacelle according to claim 1, wherein the ring-shaped seal forms a smooth and edge-free boundary of the additional flow channel.

11. The engine nacelle according to claim 1, wherein, at an inner side, the displaceable upstream section forms a downstream-projecting wall area that is positioned radially inside the ring-shaped seal and that delimits the engine inlet in the closed state of the additional flow channel.

12. The engine nacelle according to claim 1, wherein the additional flow channel and the ring-shaped seal are configured such that the air exiting the additional flow channel enters the engine inlet substantially in the axial direction.

13. The engine nacelle according to claim 1, and further comprising a linear displacement device for displacing the stationary downstream section and the displaceable upstream section with respect to each other.

14. The engine nacelle according to claim 13, wherein the linear displacement device includes multiple actuators each comprising at least one linearly movable arm, wherein the multiple actuators are distributed along a circumference of the nacelle wall.

15. The engine nacelle according to claim 1, wherein the displaceable upstream section of the nacelle wall is additionally arranged so as to be tiltable with respect to the stationary downstream section.

16. The engine nacelle according to claim 15, wherein the linear displacement device includes multiple actuators each comprising at least one linearly movable arm, wherein the multiple actuators are distributed along a circumference of the nacelle wall, and wherein the linearly movable arms are extended to different extents in the first upstream position of the displaceable upstream section.

17. The engine nacelle according to claim 1, wherein the stationary downstream section includes a sound-absorbing cladding adjacent to the engine inlet.

18. The engine nacelle according to claim 1, wherein the displaceable upstream section of the engine nacelle is formed by the inlet lip.

19. The engine nacelle according to claim 1, wherein the engine inlet is a supersonic inlet.

20. An engine nacelle for a turbofan engine of a supersonic aircraft, comprising:
   a nacelle wall that has an inner side and an outer side, wherein the nacelle wall comprises an inlet lip that is formed at an upstream end of the engine nacelle,
   an engine inlet that is formed as a supersonic inlet and takes in air required for an associated engine, and is delimited by the inner side of the nacelle wall, wherein
   the nacelle wall has a stationary downstream section and a displaceable upstream section that is displaceable in an axial direction, the displaceable upstream section being displaceable between a first upstream position and a second downstream position, a ring-shaped seal that is formed between the stationary downstream section and the displaceable upstream section, wherein in the first upstream position of the displaceable upstream section, the engine nacelle forms a ring-shaped additional flow channel with an opening to the outer side positioned in the nacelle wall axially between an upstream portion of the stationary downstream section and a downstream portion of the displaceable upstream section, the ring-shaped additional flow channel extending from the outer side of the nacelle wall, through the opening, to the engine inlet and via which the air flows into the engine inlet, the ring-shaped additional flow channel is closed in the second downstream position of the displaceable upstream section, wherein the upstream portion of the stationary downstream section directly abuts a downstream portion of the ring-shaped seal and the downstream portion of the displaceable upstream section directly abuts an upstream portion of the ring-shaped seal such that the ring-shaped seal is positioned axially between the upstream portion of the stationary downstream section and the downstream portion of the displaceable upstream section, the ring-shaped seal forms a smooth and edge-free downstream boundary of the additional flow channel, and the displaceable upstream section of the engine nacelle is formed by the inlet lip.

* * * * *